United States Patent [19]

Svenson et al.

[11] 3,876,097
[45] Apr. 8, 1975

[54] METHOD AND APPARATUS FOR LOADING AND DISCHARGING GENERAL CARGO

[76] Inventors: Karl Börje Lennart Svenson, Mirandavägen 32, S-213 63 Malmö; Per-Olof Albin Erlandsson, Norrevång 22, S-240 17 Södra Sandby, both of Sweden

[22] Filed: Aug. 7, 1973

[21] Appl. No.: 386,413

[30] Foreign Application Priority Data
Aug. 14, 1972 Sweden .................. 10509/72

[52] U.S. Cl. ............. 214/514; 214/6 F; 214/8.5 R; 214/15 R; 214/750
[51] Int. Cl. ............................. B60p 1/00
[58] Field of Search ....... 214/152, 16.4 A, 650–654, 214/650 SG, 14, 15 R, 512, 514

[56] References Cited
UNITED STATES PATENTS

| | | | |
|---|---|---|---|
| 2,405,893 | 8/1946 | Leftwich | 214/15 R |
| 2,684,165 | 7/1954 | Hill | 214/654 |
| 3,332,716 | 7/1967 | Gridley | 214/15 R X |
| 3,519,147 | 7/1970 | Walda | 214/15 R |
| 3,674,159 | 7/1972 | Lemelson | 214/16.4 A |

FOREIGN PATENTS OR APPLICATIONS

| | | | |
|---|---|---|---|
| 1,072,041 | 3/1954 | France | 214/15 R |
| 1,292,581 | 4/1969 | Germany | 214/16.4 A |

*Primary Examiner*—Frank E. Werner
*Attorney, Agent, or Firm*—John J. Dennemeyer

[57] ABSTRACT

A motor truck is used for the mechanical loading and unloading of cargo in the hold of a ship. The motor truck has a vertically adjustable load platform of substantially the same width as the available cargo space and is equipped with conveyor means for moving the cargo on and off the platform, and between a cargo pile and the receiving station for the cargo.

6 Claims, 17 Drawing Figures

METHOD AND APPARATUS FOR LOADING AND DISCHARGING GENERAL CARGO

The present application relates to a method and apparatus for providing a more rapid and safer loading and discharging of general cargo on ships. By general cargo in the present sense is meant primarily bale and box shaped cargo and the method and apparatus of the invention presuppose that the bales or boxes, at least in the same horizontal area to be loaded or discharged, are of substantially the same height.

A rapid semi or fully automatic loading and discharging of such cargo offers substantial economic advantages. Furthermore, loading and discharging of general cargo of this type by conventional methods constitutes a relatively hazardous operation. By providing a greater automation of the loading and discharging process a greater reduction of the inherent risks is obtained.

The object of the present invention is to provide a method and apparatus for the mechanical loading and discharging of general cargo of the above mentioned type with a desired degree of automation so that the risks of personal injuries during loading and discharging are eliminated, the risks for causing damage to the cargo are minimized, and furthermore so that a relatively small amount of time and mechanical equipment is required to rapidly and effectively load and discharge a ship.

According to the invention this is substantially accomplished by performing the loading and discharging operation in the manner described hereafter and as defined in the appended claims.

The invention will be further described with reference to the accompanying drawings diagrammatically showing an embodiment of an apparatus according to the invention and wherein.

Figure 1:
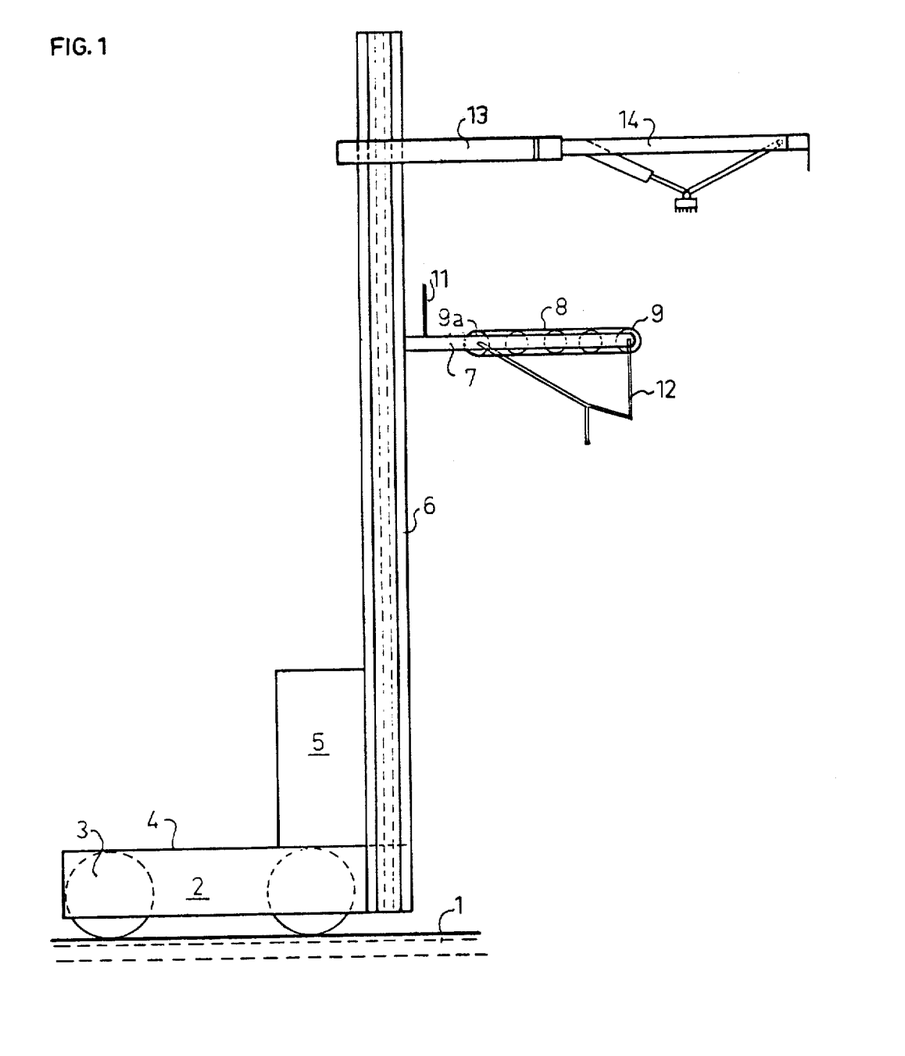
FIG. 1 is a diagrammatic side view of a motor truck according to the invention.

According to a preferred embodiment of an apparatus for performing the method according to the invention a truck is used which is essentially of the type diagrammatically shown in a side view in FIG. 1.

In the embodiment illustrated the cargo space of the ship is divided in the fore and aft direction in such a manner that a special apparatus for accomplishing the method according to the invention serves each half of the cargo space.

The truck according to the invention shown in FIG. 1 may be driven on a rail 1 in the floor of the cargo space. The truck has a sub-rack 2 and wheels 3 journalled in the sub-rack and driven by an engine, suitably placed and not shown. The sub-rack 2 comprises a platform 4 and an operating panel box 5, the latter containing necessary control and automatic means for various functions of the truck to be further described hereinafter. At both corners on one side the truck is provided with a vertical loading carrying beam or column 6, the design and function of which is better seen in FIG. 2.

Figure 2:
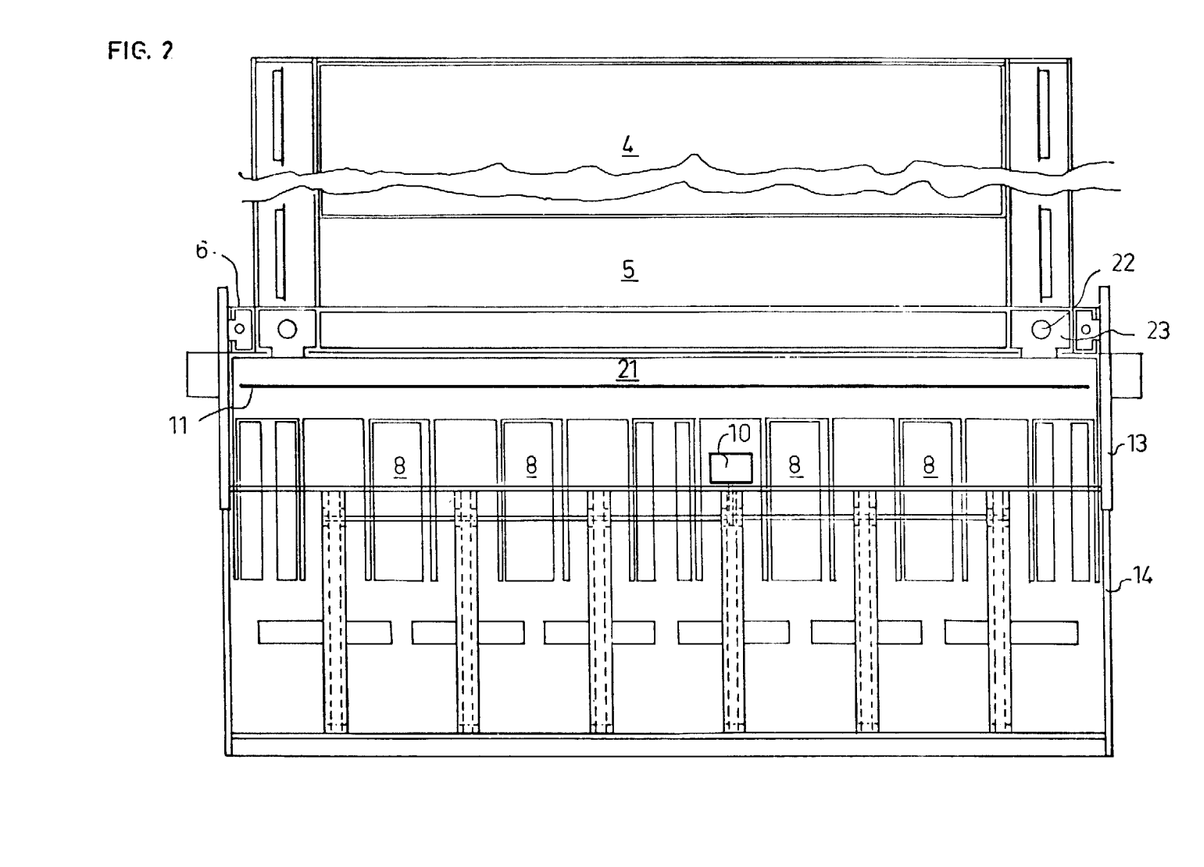
FIG. 2 illustrates in more detail the truck in a top view.

The columns 6 carry a substantially horizontal load surface 7 which is vertically adjustable and provided with transverse conveyor belts 8 running over rolls 9. The conveyor belts may be driven in one direction or the other by means of an engine not shown, driving the rolls 9a through a reduction unit and a shaft. The rest of the rolls 9 are not driven.

The load surface 7 is provided with a discharging plate 11 that may be moved to and fro over the load surface and is used for discharging in a manner to be further described hereafter. A support 12 for the cargo is mounted at the forward edge of the load surface and suitably foldable in such a manner that it does not interfere during handling of the lowermost cargo row.

Figure 3:
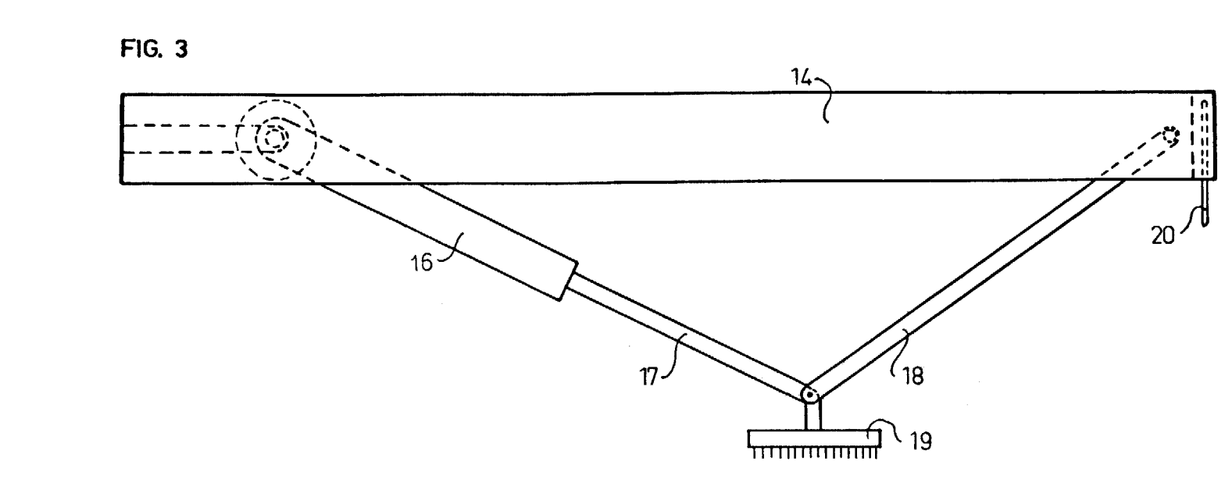
FIG. 3 shows a side view of a load carrying arm or a card.
Figure 4:
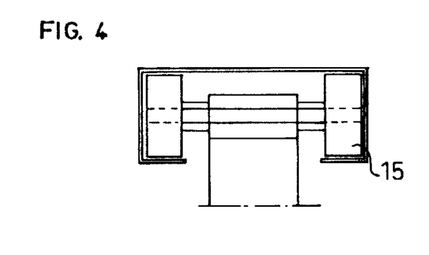
FIG. 4 is an end view of the apparatus according to FIG. 3.

A substantially horizontal frame work 13 that may be lowered and raised is mounted above the load surface 7, this frame work being journalled to the column in such a manner that it may also be folded upwardly/backwardly in a manner to be further described. The outer portion 14 of the frame work is movable for reasons to be more fully described in connection with the description of the intended operation of the truck, and thus movable to and fro relative to the frame work 13 by means of an engine 10, as can be seen from FIG. 2. The outer portion of the frame work is provided with a plurality of bracket elements of a type hereafter referred to as cards (FIGS. 3 and 4). Each such card comprises a U-shaped beam 14 having bent-in flanges and a pair of wheels 15 running inside the flanged portion and journalled in one end of a telescopic spring element 16. The piston rod 17 of the telescopic spring element 16 is connected at its free end to one end of an arm 18 whose other end is journalled near the outer end of the beam 14. The piston rod and the arm form a resilient knee joint and the actual card is journalled by the knee. The card comprises a nailed or pointed plate 19 to catch and hold the general cargo from above to be further described hereafter. Furthermore, at the outermost part of the beam 14 a gripper 20 is provided to catch the top outer edge of the general cargo.

As seen in FIG. 2 the load surface as well as the card have essentially the same operating width and in the embodiment shown this is presumed to be the same as the effective width of the cargo space.

The described embodiment is illustrated diagrammatically and only those features are discussed which are absolutely necessary for the understanding of the invention. In the following is further described how the loading and discharging is taking place according to the invention but it may be suitable to describe beforehand some further details of the truck according to the selected embodiment. It is quite possible to design the columns 6 telescopically in such a manner that the load surface 7 may be raised up to or above the level of the deck and loading and discharging to and from a quay may be accomplished by means of a conveyor directly to and from the load surface. However, in most cases such an arrangement would be too unstable or complicated and thus, according to a preferred embodiment of the invention, another way is chosen.

As can be seen from FIG. 2 the load surface 7 is provided with free spaces between the conveyor belts 8 so that each conveyor belt extends like fingers from a rear beam or similar means 21 on which they are mounted.

The same as the beams 14 the columns 6 are U-shaped, with bent-in flange edges, and the beam 21 is mounted to be raised and lowered by means of screws 22 in guides 23, travelling in the beams 6, respectively, and said screws are driven by suitable engines, not shown, in the sub-rack 2 of the truck, preferably in the operating panel box. As can be seen from FIG. 2 the card is raised and lowered in the same manner but by what means these and other movements are accomplished in detail is unnecessary for the understanding of the invention and within reach for the man skilled in the art. The free spaces are provided for the use of an elevator device 24 between the deck and cargo space, only diagrammatically indicated, to transport the general cargo in the vertical direction. Thus the elevator device 24 is provided with corresponding fingers fitting into the spaces.

Further details required for the understanding of the invention will be described in connection with the following work description.

Figure 5:
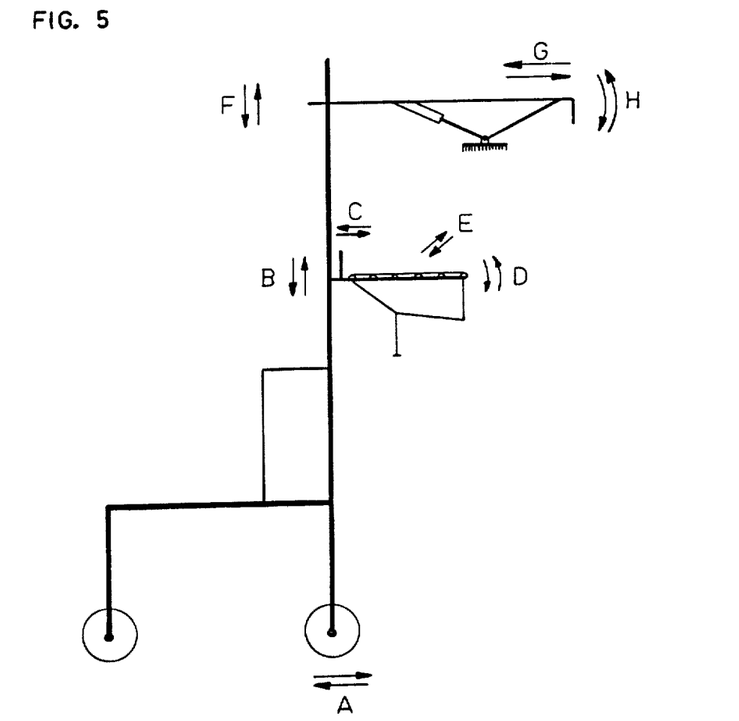
FIG. 5 is an essentially diagrammatic view of the truck indicating the various functional movements thereof.

Thus in FIG. 5 the truck of the invention is shown in a side view, but basically diagrammatic to illustrate the various possible movements of the truck and the details thereof.

Consequently the truck may primarily be driven forwardly and backwardly as marked by the pair of arrows A and the driving speed is suitably adjustable between a high speed and a low speed inching along forward.

The load surface may be raised and lowered as marked by the pair of arrows B. The discharger 11 may be displaced forwardly and backwardly as marked by the pair of arrows C. The conveyor belts 8 may be driven in both directions, marked by the pair of arrows D.

To assure better locking of the cargo area the conveyor belts of the load surface are automatically movable, in a manner not described more fully, in one direction and the other approximately 1 decimeter, as marked by the pair of arrows E. It is understood that such a movement may be accomplished in several ways, all being equally suitable, for example by journalling the rolls of the conveyor belts in a stand being displaceable by means of a motor. Appropriately the displacement may take place automatically so that before every second discharging the load surface is displaced in one direction and before every other second discharging it is displaced in the opposite direction.

Also the card has a great freedom of adjustment. Thus it may be raised and lowered as marked by the pair of arrows F. The forward portion of the card may be extended and retracted, as marked by the pair of arrows G. The card may also be turned relative to the attachment point of the column 6 indicated by the pair of arrows H. Finally, the link system to which the actual card is attached may be adjusted by variation of the length of the telescopic spring element 16, whereby the spring element may comprise a single screw spring or, for example, a pneumatic or hydraulic piston.

General cargo may be supplied to the elevator mentioned earlier, in case such an elevator is needed, in several different ways, not forming an object of the present application. Thus in FIG. 6a the cargo 26 to be loaded is supplied to the elevator device 24 in a suitable manner at or above the height level of the deck 27, and thereafter the elevator device is lowered to the position shown in this Figure. The truck is in the original position, i.e. driven inwardly against one of the transverse bulkheads of the cargo space, suitably shaped in such a manner that the sub-rack of the truck extends into a recess in order to waste as little cargo space as possible.

Figure 6A:
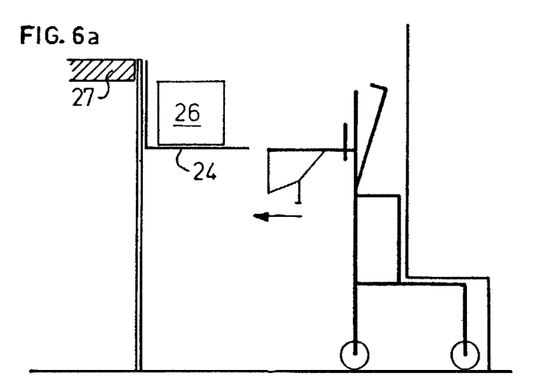
FIGS. 6a–6h show the various functions of the truck during loading of cargo.

From the original position the truck slowly moves towards the elevator with cargo, having the card arm 13, 14 folded backwardly and lowered so that it does not interfere with the cargo. The card is only used during discharge of the cargo and thus is mentioned only in connection with the description of the discharging. All the previous and subsequent movements of the truck are carried out preferably according to a preselected program including parameters that are varied during the course of the loading and discharging depending upon is-signals from suitable position sensing elements. Of course for most reasons it is desired to automatically guide the movements of the truck according to the invention but it is not to be understood in such a way that the method or the apparatus according to the invention are necessarily limited to an automatic operation.

Figure 6B:
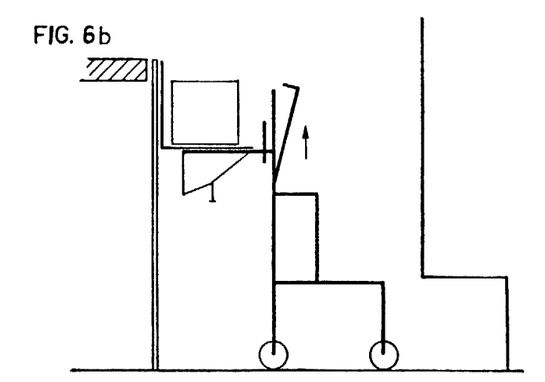

In FIG. 6b the truck is shown moved below the elevator device. Measures must be taken to make sure that the fingers of the load surface are free in their movement between the fingers of the elevator device during the subsequent lifting movement. How this is to be accomplished is evident to the man skilled in the art and need no further explanation.

Figure 6C:
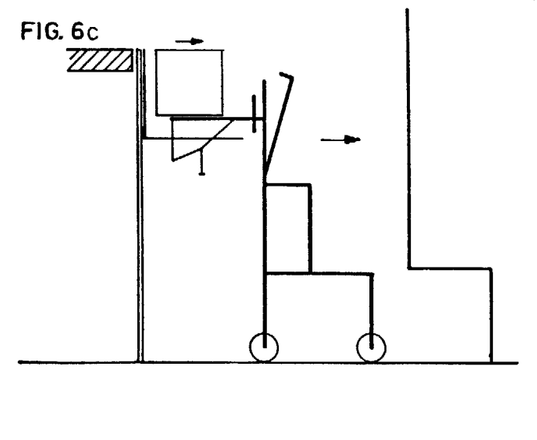

FIG. 6c illustrates how the load surface is raised and has lifted the cargo one or several decimeters above the plane of the elevator device. Thereafter, the truck is moved back to the position shown in FIG. 6d, i.e. the original position, so that the elevator may be elevated up into the cargo space. The cargo on the upper side of the load surface operates a height sensing element designed in such a manner and positioned so that it automatically lowers the cargo to a position where it is free from the edge of the cargo hatch and the ceiling of the cargo space.

In order that the truck may be automatically moved to the correct position to pile the cargo in the cargo space, i.e. to know which distance to travel from the original position, counters or similar means are provided to register the way, these means being preferably set over the length of the cargo space. Of course this may be done in several different ways and therefore constitutes no essential part of the invention.

Figure 6D:
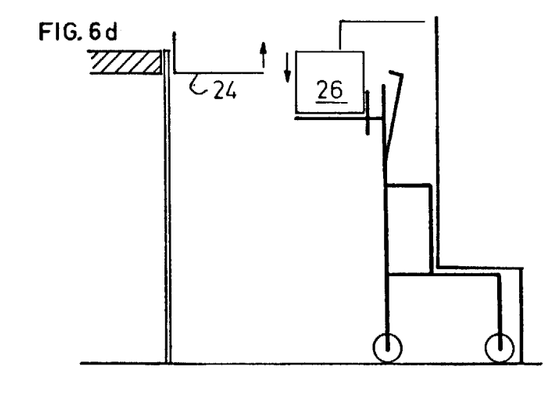
Figure 6E:
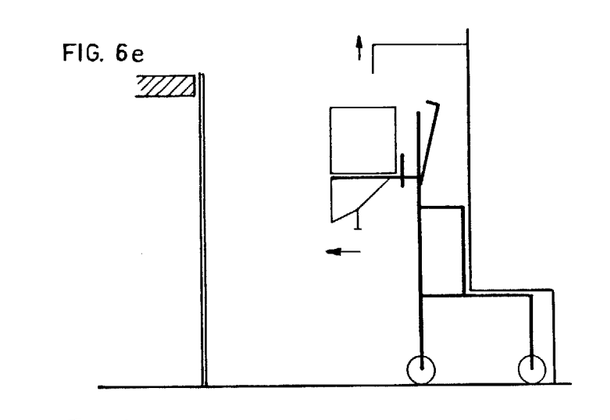

The truck starts from the original position shown in FIG. 6d, at a high speed, see FIG. 6e, toward the opposite wall of the cargo space. Approximately 5 meters from the adjacent cargo pile according to information from the counter, the truck changes to slow speed and continues running forwardly therefrom until a limit position breaker means or the like, not shown, on the forward edge of the load surface makes contact with the wall of the cargo space or the cargo pile, whereby the truck stops. This position is illustrated in FIG. 6e.

Figure 6F:
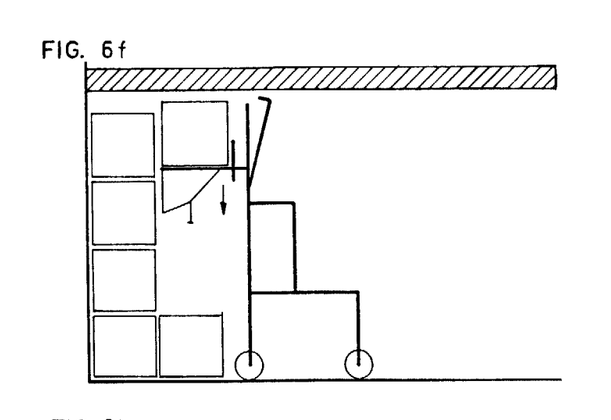

When the truck is stopped as described above it reverses about 1 dm to be free of any irregularities in the cargo already piled up and thereafter the load surface is lowered until the under side thereof rests on the cargo row positioned underneath. The load surface stops in the position shown in FIG. 6f and according to a preferred embodiment of the invention the load surface, before the cargo is finally put down, is displaced a certain distance sideways so that the load surface is displaced every second time in one and every other second time in the other direction. In this case the cargo of the mentioned kind is better locked to a stable pile.

Suitably, the displacement may be a few decimeters in one direction or the other.

Figure 6G:
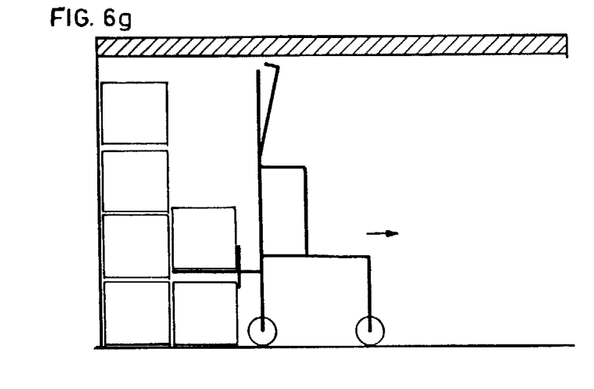
Figure 6H:
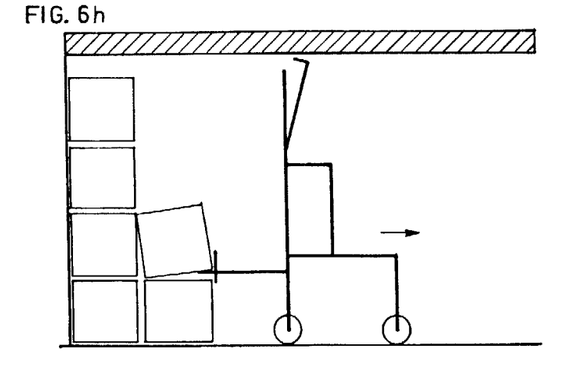

The load on the load surface is transferred to the pile by means of the discharger 11 primarily levelling the cargo row. When the discharger, in a manner not further described herein, is operated both by contact with the cargo and by the cargo positioned underneath, the conveyor belts are started at the same time as the truck starts to move backwardly. A pre-control provides that as long as only a portion of the discharger is operated the truck moves backwardly but when both portions are operated also the conveyor belts are started. This is illustrated in FIGS. 6g–h. It is understood that the combination of conveyor belts and a discharger in different aspects may be used to handle all sorts of cargo of the mentioned type, from boxes to bales, and that the loading method described above is very gentle to the cargo and the loading may be performed very rapidly and totally automatically.

From the position shown in FIG. 6g the truck automatically returns to the original position shown in FIG. 6a, whereby of course the elevator device is not lowered during the returning movement.

Figure 7A:
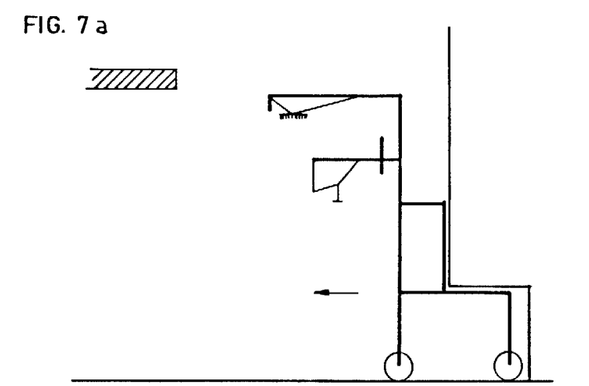
FIGS. 7a–7d illustrate the discharge of cargo.

According to the invention the movement of the truck during the discharging operation is essentially reversed to the loading operation with the exception that a.o. the card is used. Thus, for discharge the truck starts from the original position illustrated in FIG. 6a but with the card horizontally extended forwardly and in the top position, as illustrated in FIG. 7a, and also having the load surface in a top position just below the card. In the same manner as was the case for loading, the truck first moves at a high speed and thereafter at a low speed toward the cargo row, whereby the change from a high to a low speed occurs in relation to a signal from the mentioned counter, not shown.

Figure 7B:
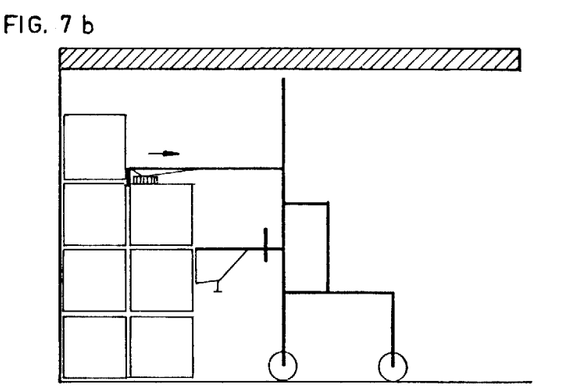

The card as well as the load surface are at their respective front edges suitably provided with end position breakers so that the truck stops when one of these or both make contact with the cargo pile. When the card has made contact with the cargo pile the load surface is lowered to a position immediately below the lower edge of the upper cargo row, as illustrated in FIG. 7b. Principally this position may be observed in several different ways, e.g. by means of photo cells, not shown, or the like, or mechanically by means of sensing fingers, but the method by means of which the position sensing is accomplished is not of substantial importance per se for the understanding of the invention.

When the load surface has reached the correct position the conveyor belt is started so that the upper parts thereof are moved in a direction toward the truck. The card serving as a sensing element in searching for the cargo pile is retracted some decimeters or a distance long enough to be lowered and yet be free of the wall or any cargo pile positioned behind.

Figure 7C:
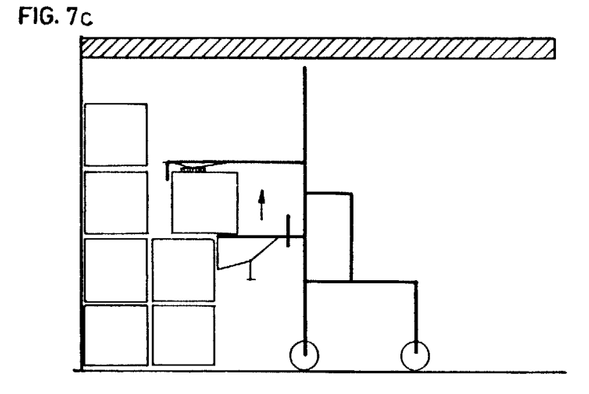

Thereafter the card is lowered to the position shown in FIG. 7c where the gripper 20 thereof catches the outer edge of the cargo and the actual card 19 is pressed against the top surface of the cargo with an adjustable force. In practice this may suitably be accomplished by the card with its gripper rakes to and fro above the cargo a few times and returns all the way against the wall or cargo pile positioned behind in such a manner that the gripper positively catches behind the upper rear edge of the cargo. Of course it is necessary during this operation to permit the card to be lowered into contact with the top side of the cargo to the position shown in FIG. 7c.

Figure 7D:
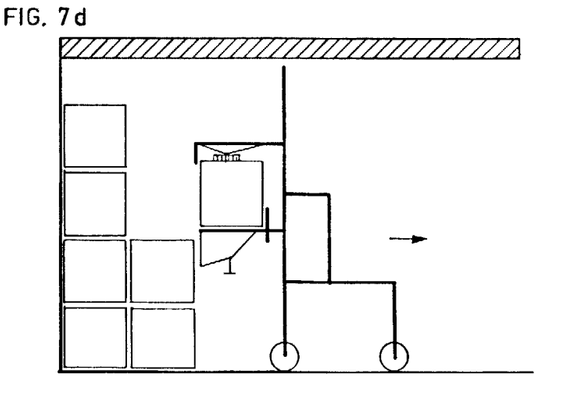

After the cargo has been pushed a certain distance on the load surface by means of the gripper to the position shown in FIG. 7d the load surface is somewhat raised before the card and conveyor belts together fully pull the cargo onto the load surface to the position shown in FIG. 7e. By the raising action the contact surface is reduced and thus also the friction between the cargo rows in such a manner that discharging may be accomplished by a smaller force effort. When the cargo is loaded onto the truck the latter travels at a high speed toward the cargo space hatch and thereafter at a low speed to the original position thereof shown in FIG. 6a. In this position the card is raised and folded backward, the elevator device is lowered, and subsequently the truck is moved toward the elevator taking care of the cargo and further feeding it by some suitable conveyor to a quay. This does not seem to need any further explanation.

It is to be understood that the embodiment described above may be modified in several ways evident to the man skilled in the art both concerning the mode of operation and construction without therefore departing from the inventive spirit of the following claims.

What is claimed is:

1. Apparatus for mechanical loading or discharging of general cargo from ships, comprising:
   a. a vehicle movable on the floor of a cargo space including substantially vertical carrier means,
   b. a load support having a generally horizontal surface extending in one direction from and vertically movable along said carrier means, said surface comprising a plurality of laterally spaced conveyor belts to facilitate discharging and loading of cargo, respectively,
   c. catching means movably mounted on said carrier means above the load support to grip, hold and/or pull the cargo to and from said support, characterized in that said catching means includes: a catcher member arranged to be pressed against the top surface of the cargo with such a pressure that the cargo, by moving the catcher in one direction, may be moved horizontally onto or off of said support, and including a gripper arranged to engage the outer edge of the cargo and pull the cargo onto the load support of the vehicle.

2. Apparatus as defined in claim 1 wherein said catcher is provided with means whereby it may be pressed against the surface of the cargo with an adjustable force.

3. Apparatus as defined in claim 2 wherein the catcher includes a plate, the load engaging surface of which is provided with downwardly pointed prongs.

4. Apparatus as defined in claim 1 wherein said catching means includes a framework mounted on the carrier means; the frame work being provided with a movable outer portion on which the catcher is movably mounted and on the outermost end of which the gripper is mounted.

5. Apparatus as defined in claim 4 wherein the outer portion of the framework comprises an inverted u-shaped beam having inturned flanges and a pair of wheels running on the flanges, said wheels being journalled in one end of a telescopic spring element, the end of the piston rod of which is connected to one end of an arm, the opposite end of which is journalled near the outer end of the beam to form a knee joint, onto which the catcher is pivotally mounted at the joint between the piston rod and the arm.

6. Apparatus as defined in claim 5 wherein the gripper comprises a plate extending downwardly from the beam outwardly of the catcher.

* * * * *